(12) United States Patent
Ganssle

(10) Patent No.: US 10,796,150 B2
(45) Date of Patent: Oct. 6, 2020

(54) AUTOMATED DIAGNOSIS AND TREATMENT OF CROP INFESTATIONS

(71) Applicant: Farmwave, LLC, Alpharetta, GA (US)

(72) Inventor: Craig Ganssle, Alpharetta, GA (US)

(73) Assignee: FARMWAVE, LLC, Alpharetta, GA (US)

( * ) Notice: Subject to any disclaimer, the term of this patent is extended or adjusted under 35 U.S.C. 154(b) by 0 days.

(21) Appl. No.: 16/254,963

(22) Filed: Jan. 23, 2019

(65) Prior Publication Data

US 2019/0171880 A1 Jun. 6, 2019

Related U.S. Application Data

(62) Division of application No. 15/447,814, filed on Mar. 2, 2017.

(51) Int. Cl.
*G06K 9/00* (2006.01)
*A01G 22/00* (2018.01)

(52) U.S. Cl.
CPC ......... *G06K 9/00657* (2013.01); *A01G 22/00* (2018.02)

(58) Field of Classification Search
CPC ...... A01G 22/00; A01G 7/06; G06K 9/00657; G06K 2209/17
See application file for complete search history.

(56) References Cited

U.S. PATENT DOCUMENTS

| | | | | |
|---|---|---|---|---|
| 2004/0264762 | A1* | 12/2004 | Mas | G06K 9/00664 382/154 |
| 2014/0376771 | A1* | 12/2014 | Moon | G06K 9/00657 382/103 |
| 2016/0050840 | A1* | 2/2016 | Sauder | G06K 9/00657 701/3 |
| 2017/0374323 | A1 | 12/2017 | Gornik | |

OTHER PUBLICATIONS

Grelier Coralie, Jul. 28, 2014. IntelliScout, l'application Google Glass pour l'agriculture. https://www.goglasses.fr/googleglass/intelliscoutapplicationgoogleglasspouragriculture. Accessed Mar. 31, 2017.
Swamy, Rohan, Jul. 28, 2014. http://gadgets.ndtv.com/wearables/features/how-google-glass-could-be-the-next-big-thing-for-agriculture-566542, Gadgets 360. Accessed Mar. 31, 2017.

* cited by examiner

*Primary Examiner* — Tom Y Lu
(74) *Attorney, Agent, or Firm* — Thomas Horstemeyer, LLP

(57) ABSTRACT

Disclosed are various embodiments for automating the diagnosis of crop infestations and estimating crop yields. In some embodiments, a field report that includes an image of a crop and a location of a corresponding field is received from a computing device. The image of the crop is processed using computer-vision techniques to identify a pathogen affecting the crop. A biocide to apply to the crop to treat the pathogen is then identified. In some embodiments, the yield of the crop can also be estimated. In such embodiments, a field report that includes images of plants in a field and an (Continued)

identifier of the field is received. A computer-vision technique is applied to each image to determine an individual yield of each plant in an image. An estimate of the yield of the crop is then calculated based on the individual yields of the plants and the size of the field.

12 Claims, 9 Drawing Sheets

AUTOMATED DIAGNOSIS AND TREATMENT OF CROP INFESTATIONS

CROSS-REFERENCE TO RELATED APPLICATIONS

This divisional application claims priority to, and the benefit of, pending U.S. patent application Ser. No. 15/447,814, filed on Mar. 2, 2017 and entitled "AUTOMATED DIAGNOSIS AND TREATMENT OF CROP INFESTATIONS."

BACKGROUND

Crop yields can be impacted by a number of factors, including weather, pests, and diseases. Typically, pests and diseases can be treated with various pesticides, fungicides, or other biocides. These pests and diseases are often identified and diagnosed by licensed agronomists, who also prescribe specific treatment regimens of appropriate biocides.

Unfortunately, manual diagnosis of specific pathogens by agronomists is often subjective and therefore inaccurate. For example, some crop pathogens can present with similar symptoms, causing different agronomists to arrive at different diagnoses. More commonly, different agronomists may classify an infestation of a crop at different levels of severity, resulting inconsistent treatment of crops. For example, misclassification of the severity of an infestation can result in under-treatment of the crop, which decreases the crop yield. Similarly, misclassification of the severity of the infestation can result in overtreatment of the crop, causing the crop to be treated with unnecessary amounts of biocides.

SUMMARY

Various embodiments of the present disclosure encompass a system that includes a first computing device including a processor and a memory; and machine readable instructions stored in the memory that, when executed by the processor, cause the first computing device to at least: receive a field report from a second computing device, the field report including a plurality of images of a corresponding plurality of plants in a crop and an identifier of a respective field; apply a computer-vision technique to each image in the plurality of images to determine an individual yield for each of the corresponding plants in the crop; determine a size of a corresponding field based on the identifier of the corresponding field; and calculate an estimated crop yield based at least in part on the individual yield for each of the corresponding plants in the crop and the size of the corresponding field. In some embodiments, the machine readable instructions further cause the first computing device to at least: apply the computer-vision technique to each image in the plurality of images to determine a type of the crop; and calculate the estimated crop yield based at least in part on the type of the crop. In some embodiments, the machine readable instructions stored in the memory that cause the first computing device to at least apply the computer-vision technique to each image in the plurality of images to determine the individual yield for each of the corresponding plants in the crop further causes the first computing device to at least: apply a first object-recognition technique to each image in the plurality of images to determine a type of the crop; select a second object-recognition technique based on the type of the crop; and apply the second object-recognition technique each image in the plurality of images to determine the individual yield for each of the corresponding plants in the crop. In some embodiments, the estimated crop yield is further based at least in part on planting data associated with the corresponding field. In some embodiments, the second computing device includes a wearable computing device. In some embodiments, the second computing device includes a mobile computing device.

Various embodiments of the present disclosure encompass a system that includes a first computing device including a processor and a memory; and machine readable instructions stored in the memory that, when executed by the processor, cause the first computing device to at least: receive a field report from a second computing device, the field report comprising an image of a crop and a location of a corresponding field; process the image of the crop using a computer-vision technique to identify a pathogen affecting the crop; and identify a biocide to apply to the crop based at least in part on an identity of the pathogen. In some embodiments, machine readable instructions cause the first computing device to further: process the image of the crop using the computer-vision technique to determine a severity of an affliction of the pathogen; and calculate an amount of the biocide to apply to the crop based at least in part on the severity of the affliction of the pathogen. In some embodiments, the machine readable instructions cause the first computing device to further calculate the amount of the biocide to apply to the crop based at least in part on a seed type of the crop in the corresponding field. In some embodiments, the machine readable instructions cause the first computing device to further calculate the amount of the biocide to apply to the crop based at least in part on a prior biocide application to the crop in the corresponding field. In some embodiments, the machine readable instructions cause the first computing device to further calculate the amount of the biocide to apply to the crop based at least in part on planting data for the crop in the corresponding field. In some embodiments, the machine readable instructions cause the first computing device to further calculate a predicted yield for the crop based at least in part on the pathogen, the severity of the pathogen, and the amount of the biocide to be applied to the crop. In some embodiments, the machine readable instructions that cause the first computing device to identify the biocide to apply to the crop based at least in part on the identity of the pathogen further cause the first computing device to identify the biocide based at least in part on one or more of a prior biocide application to the crop in the corresponding field, planting data for the crop in the corresponding field, a seed type of the crop in the corresponding field, irrigation data associated with the corresponding field, fertilizer application data associated with the corresponding field, or weather data associated with the corresponding field.

Various embodiments of the present disclosure encompass a computer-implemented method that includes receiving a field report from a computing device, the field report comprising an image of a crop and a location of a corresponding field; processing the image of the crop using a computer-vision technique to identify a pathogen affecting the crop; and identifying a biocide to apply to the crop based at least in part on an identity of the pathogen. Some embodiments of the computer-implemented method further include processing the image of the crop using the computer-vision technique to determine a severity of an affliction of the pathogen; and calculating an amount of the biocide to apply to the crop based at least in part on the severity of the affliction of the pathogen. In some embodiments of the computer-implemented method, calculating the amount of the biocide to apply to the crop is further based at least in part on a seed type of the crop in the corresponding field. In some embodiments of the computer-implemented method, calculating the amount of the biocide to apply to the crop is further based at least in part on a prior biocide application to the crop in the corresponding field. In some embodiments of the computer-implemented method, calculating the amount of the biocide to apply to the crop is further based at least in part on planting data for the crop in the corresponding field. Some embodiments of the computer-implemented method further include calculating a predicted yield for the crop based at least in part on the pathogen, the severity of the pathogen, and the amount of the biocide to be applied to the crop. In some embodiments of the computer-implemented method, identifying the biocide to apply to the crop is further based at least in part on the identity of the pathogen further cause the computing device to identify the biocide based at least in part on one or more of a prior biocide application to the crop in the corresponding field, planting data for the crop in the corresponding field, a seed type of the crop in the corresponding field, irrigation data associated with the corresponding field, fertilizer application data associated with the corresponding field, or weather data associated with the corresponding field.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
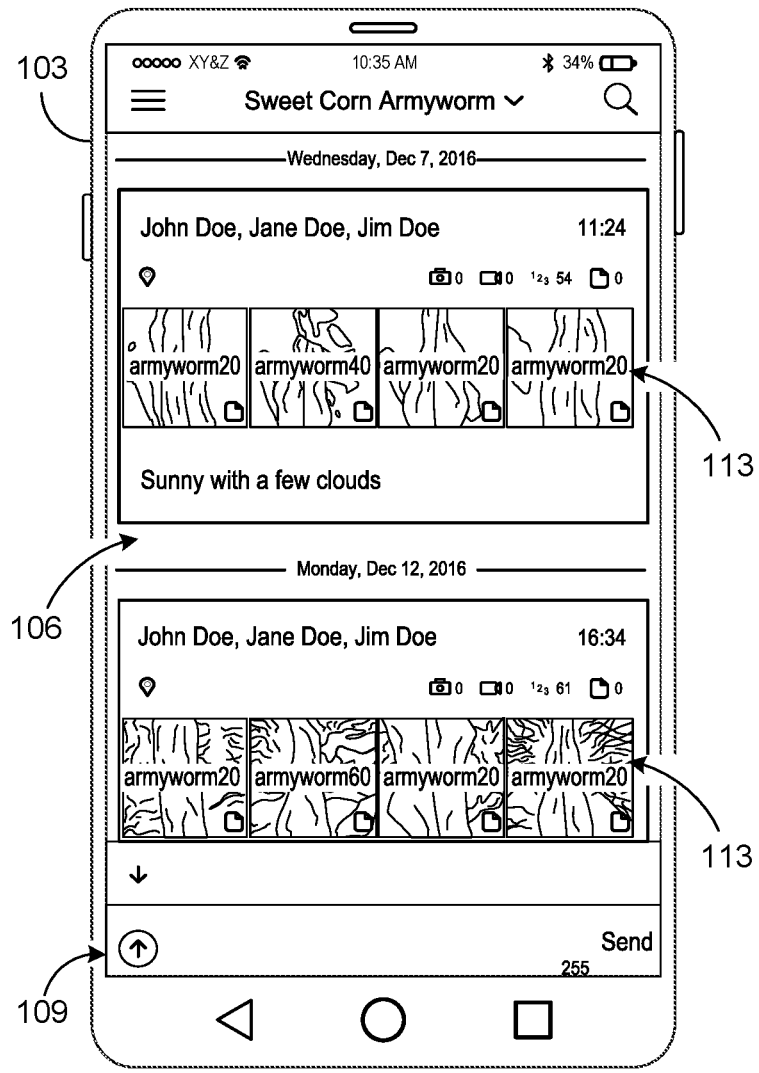
FIG. 1 is a drawing of an example implementation of various embodiments of the present disclosure.

Disclosed are various embodiments for automating the identification of pathogens afflicting a crop and estimating a crop's yield. Manual identification of pathogens and classification of their severity, which is the current standard approach, is accurate approximately 65% of the time. In contrast, the automated approaches discussed herein have accuracy ratings approaching 90%. Moreover, manual diagnosis of an infestation is a process that routinely takes up to a week or more to complete, during which time an infestation of the pathogen can increase in severity and continue to consume a crop. In contrast, various embodiments of the present disclosure to decrease diagnosis times to as little as 24 hours. Likewise, manual estimation of crop yield, which is the current standard approach in the agricultural industry, can lead to estimates that differ from the actual crop yield by as much as 70%. In contrast, the automated approaches discussed herein provide for crop yield estimates that differ from the actual crop yield by as little as 30%. These improvements over the current approaches are achieved through the application of computer-vision techniques and machine learning to field data and crop images, as described herein. The improved accuracy of diagnosing crop pathogens and estimating crop yields, according to various embodiments of the present disclosure, improve agriculture in a number of ways.

A first improvement in the field of agriculture resulting from various embodiments of the present disclosure is containing outbreaks of pathogens within a crop. If an infestation of a crop is diagnosed incorrectly or the severity of an infestation is misjudged, the wrong treatment may be prescribed (e.g., a pesticide to treat a fungal infestation) or the incorrect dosage of a biocide may be prescribed (e.g., a severe infestation may not be treated with a sufficient amount of a biocide). As a result, the original infestation can continue to consume the crop, decreasing the ultimate crop yield, until the infestation is correctly diagnosed and the correct dosage of an appropriate biocide is applied.

A second improvement in the field of agriculture resulting from various embodiments of the present disclosure is improved crop yields. By decreasing the amount of time it takes to diagnose an infestation and classify its severity, the spread of the infestation is contained more quickly. For example, a quicker diagnosis allows for treatment to begin sooner. As a result, less of the crop is consumed by the infestation compared to previous approaches which involved longer times to diagnose an infestation. As a result, more of a crop can be harvested from an affected field.

A third improvement in the field of agriculture resulting from various embodiments of the present disclosure is a decreased reliance on biocides (e.g., pesticides, fungicides, herbicides, etc.). When the severity of pathogens is manually classified, there can be a tendency to treat the affected field conservatively. For example, a greater amount of a biocide than is necessary may be used to treat an infestation in case the actual severity of the infestation was greater than the manually diagnosed severity. In contrast, the more accurate and less subjective diagnosis of pathogens and the severity of an infestation provided by various embodiments of the present disclosure allows for fewer biocides to be used (e.g., the correct amount of a biocide will be applied rather than a conservative amount that overtreats the diagnosed infestation). Limiting the use of biocides not only decreases the costs associated with planting and harvesting a crop, but is also more environmentally friendly as fewer biocides are released into the environment.

FIG. 1 depicts an example use case of an embodiment of the present disclosure. In FIG. 1, a client device 103, such as mobile computing device (e.g., smartphone) is depicted rendering a user interface 106 on a display 109. Within the user interface 106 is a series of images 113 taken of a crop in a field. The images 113 have been uploaded to a remote computing device, which has identified an infestation of army worm in a crop of corn and determined a severity rating of the infestation based on the images 113. The identified images 113 have been subsequently shared so that other users can view the images 113 and comment or act on them.

Figure 2:
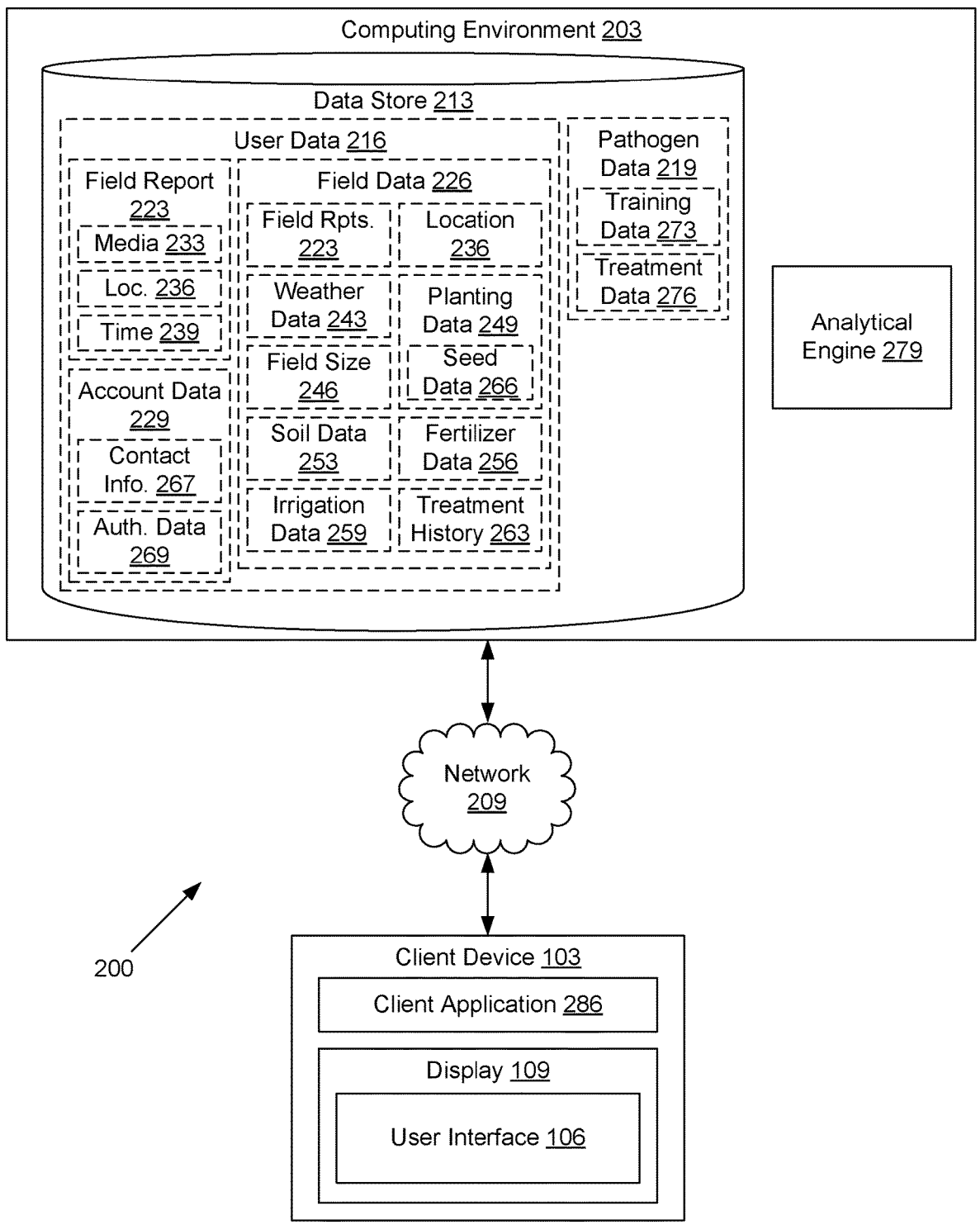
FIG. 2 is a drawing of a networked environment according to various embodiments of the present disclosure.

With reference to FIG. 2, shown is a networked environment 200 according to various embodiments. The networked environment 200 includes a computing environment 203 and a client device 103, which are in data communication with each other via a network 209. The network 209 can include the Internet, intranets, extranets, wide area networks (WANs), local area networks (LANs), or any combination of two or more such networks. For example, such networks may include wired networks (e.g., cable networks, Ethernet networks, fiber optic networks, telephone networks, digital subscriber line networks, or other wired network technologies) or wireless networks (e.g., satellite networks, IEEE 802.11 "WI-FI" networks, mesh networks, cellular networks, or other wireless network technologies).

The computing environment 203 may include a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together form a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. Also, various data is stored in a data store 213 that is accessible to the computing environment 203. The data store 213 may be representative of a plurality of data stores 213 as can be appreciated, such as relational databases, key-value stores, hierarchical databases, object-oriented databases, comma or tab separated text files, configuration files, and potentially other data stores. The data stored in the data store 213 includes, for example, user data 216, pathogen data 219, and potentially other data.

The user data 216 represents various types of data related to individual users of various embodiments of the present disclosure. Accordingly, the user data can include field reports 223 generated by or shared with individual users, field data 226 regarding the fields associated with one or more field reports 223, and account data 229 for the user. User data 216 can also include other types of data as may be appropriate for specific embodiments of the present disclosure.

A field report 223 represents information about a field reported by a user at a given point in time. Accordingly, a field report 223 can include media 233 depicting a field, a location 236 where the field report 223 was generated, and a time 239 of when the field report 223 was generated or when the data within the field report 223 was entered or recorded. A field report 223 can also include other data entered or submitted by a user to update the field data 226 of a field.

Media 233 can include one or more audio, image, or video files depicting a field. For example, pictures or videos could be taken of the field itself or of individual specimens of a crop growing in the field. Likewise, an audio file or video file corresponding to dictated notes about a field could be recorded.

The location 236 can represent one or more of the locations 236 of the user when the field report 223 was generated, the location 236 of the corresponding field, or the location 236 where the media 233 in the field report 223 was generated. In some instances, these different locations 236 may be the same. For example, if a user captures an image of a crop growing in the field and immediately uploads it while still in the field, the location 236 for where the field report was generated, the field itself, and where the media was generated would be approximately the same. However, if a user captured images of a crop growing in the field and later submitted the field report 223 to the data store 216 from home or the office, then the location 236 of the field and where the images were captured would differ from the location where the field report 223 was generated would differ. Any one or more of these locations 236 may be used by various embodiments of the present disclosure. In addition, a location 236 can be represented using various approaches, such as latitude and longitude coordinates, geohash codes, or other approaches.

The time 239 can represent when the field report 223 was created or when the data within the field report was generated. For example, the time 239 could represent when individual media 233 within the field report 223 is captured. Likewise, the time 239 could represent when the field report 223 is generated and/or stored in the data store 213. Either or both times 239 can be used according to various embodiments of the present disclosure.

Field data 226 represents information collected over time about a particular field. This data can be collected from a number of sources, such as one or more field reports 223 or through manual data entry. Accordingly, field data 226 can include one or more field reports 223 related to the corresponding field, the location 236 of the field, weather data 243, field size 246, planting data 249, soil data 253, fertilizer data 256, irrigation data 259, treatment history 263, and potentially other data as may be appropriate for specific embodiments of the present disclosure.

Weather data 243 represents the weather history of a field. This data can include a history of temperatures, precipitation, hours of daylight, and other weather data for a given field. The weather data 243 can be stored on an hourly, daily, or other basis. For example, weather data 243 could represent precipitation totals on an hourly, daily, weekly, monthly basis, or at some other desired interval. As another example, weather data 243 could represent local temperatures on an hourly, daily, weekly, monthly basis, or at some other desired interval. Weather data 243 can be sourced from a number of locations, including sensors located at the field or from another party that collects weather data, such as the National Weather Service.

The field size 246 can represent the total size of the field, the shape of the field, and/or the dimensions of the field.

Planting data 249 represents information regarding the planting of a crop on the field. This can include the identity of the crop and the manner in which the crop was planted. For example, planting data 249 could include the spacing between rows of the crop, the spacing between plantings within a row of crop, the depth in the soil at which seeds were planted, the moisture content of the soil at the time of planting, the compaction of the soil at the time of planting, and potentially other data. Planting data 249 can also include seed data 266.

The seed data 266 can represent information regarding the particular type, source, or identity of seeds used to plant a crop. Many different agricultural companies provide a wide variety of seeds that can be planted for a particular crop. As an example, an agricultural company could offer seed varieties that have been modified to grow in particular soil conditions, use less water, require less fertilizer, be resistant to particular herbicides (e.g. ROUNDUP READY® seeds), produce larger yields, etc.

Soil data 253 can represent the soil conditions of the field. This can include the type of soil (e.g., clay soil, silty soil, sandy soil, peaty soil, saline soil, loam soil, etc.), the nutrient profile of the soil, the density of the soil, the consistency of the soil, the porosity of the soil, as well as other properties.

Fertilizer data 256 can represent currently schedule fertilizer treatments for the field as well as previous fertilizer treatments. This data can include the identity of the fertilizer used, the amount of the fertilizer applied, when the fertilizer was last applied, and related data.

Irrigation data 259 can represent current and previous irrigation of the field. This can include the frequency of irrigation, the amount of water used to irrigate the crop, the method of irrigating the crop, and potentially in other data. In some instances, the irrigation data 259 can include the efficiency of the irrigation method used.

Treatment data 263 can represent data regarding prior treatments of a field with a biocide, such as a pesticide, herbicide, or fungicide. This data can include an identity of the pathogen (e.g., mold, fungus, insect, virus, etc.) afflicting the field, the crop afflicted, the identity of the biocide applied, the amount of the biocide applied, the schedule or frequency of the biocide applied, and potentially other data.

Account data 229 represents information related to an account that has permissions to access some or all of the user data 216. This can include contact information 267 of a user (e.g., email address, mailing address, phone number(s), etc.), authentication data 269 (e.g. username, password, two-factor authentication data, etc.), and potentially other data. For example, account data 229 could represent the owner of the field, an employee of the owner of the field, an agronomist that is in consultation about a potential infestation of the field, and potentially other users.

The pathogen data 219 represents data related to individual pathogens that can be identified and diagnosed with present embodiments of the present disclosure. Examples of pathogens can include insects (e.g., aphids, caterpillars, fall armyworm, African armyworm, locusts, etc.) and other invertebrates (e.g., slugs, root-knot nematodes, snails, etc.), fungi (e.g., canker rot, black root rot, soybean rust, brown rust, etc.), viruses (e.g., tobacco mosaic virus, pepper mild mottle virus, cauliflower mosaic virus, etc.), bacteria (e.g., various species of *Pseudomonas tomato*, bacterial soft rots, etc.), and molds (e.g., club root and powdery scab). Pathogen data 219 can include training data 273 and treatment data 276.

The training data 273 includes data used for training applications executing in the computing environment 203 to identify specific pathogens and their severity. Accordingly, training data 273 could include a set of images or videos of a particular pathogen afflicting a particular crop. Likewise, the training data 273 could include images or videos depicting different grades of severity of infestation of a particular pathogen.

The treatment data 276 can include data outlining or detailing a recommend course of treatment for a particular pathogen. Accordingly, treatment data 276 can include a listing of one or more recommended biocides (e.g., pesticides, fungicides, etc.) for use in counteracting an infestation of a crop, a recommended quantity of the biocide to use for a given severity and/or a given area of application, a recommended frequency of application of the biocide, a recommended biocide to be used for a given crop, seed, or soil type, and other pertinent data. The treatment data 276 may, for example, correspond to empirically established best practices The components executed on the computing environment 203 can include an analytical engine 279, and other applications, services, processes, systems, engines, or functionality not discussed in detail herein. The analytical engine 279 is executed to process the media 233 contained in a field report to identify potential infestations, severity of infestations, or estimated crop yield. These identifications and estimations may be derived using various computer-vision techniques and machine-learning techniques performed by the analytical engine 279, as further described in this application.

The client device 103 is representative of a plurality of client devices that may be coupled to the network 209. The client device 103 may be embodied in the form of a desktop computer, a laptop computer, mobile computing devices (e.g., personal digital assistants, cellular telephones, smartphones, music players, web pads or tablet computer systems, portable game consoles, electronic book readers, etc.), wearable computing devices (e.g., watches, glasses, etc.), set-top boxes, network devices (e.g. routers, switches, WI-FI access points, modems, etc.), other servers, or other computing devices with network connectivity. The client device 103 may include a display 109. The display 109 may include, for example, one or more devices such as liquid crystal displays (LCDs), gas plasma-based flat panel displays, organic light emitting diode (OLED) displays, electrophoretic ink (E-ink) displays, LCD projectors, or other types of display devices.

The client device 103 may be configured to execute various applications such as a client application 286 or other applications. The client application 286 may be executed using a client device 103, for example, to access network content served up by the computing environment 203 or other servers, thereby rendering a user interface 106 on the display 109. To this end, the client application 286 may include, a browser, a dedicated application, etc., and the user interface 106 may include a network page, an application screen, etc. The client device 103 may also be configured to execute applications beyond the client application 286 such as, for example, email applications, social networking applications, word processors, spreadsheets, messaging applications, and chat applications.

Next, a general description of the operation of the various components of the networked environment 200 is provided. To begin, a user supplies data to the analytical engine 279 related to a particular field. The analytical engine 279 causes the supplied data to be stored in a field data 226 entry. Such data can include one or more field reports 223, the location 236 of the field, weather data 243 associated with the field, planting data 249 related to the current or previously planted crops, the field size 246, soil data 253, fertilizer data 256, irrigation data 259, and treatment history 263 for any current or previous treatments of the field for pathogens. As additional data is supplied by the user, the analytical engine 279 can update the field data 226 as appropriate.

At some subsequent point in time, the user can create a field report 223 using a client application 286 installed on the client device 103. For example, a user may use the client application 286 to capture media 233 depicting the field or the crop in the field (e.g., images, video, etc.). The user can also add additional media 233 to the field report 223 using the client application 286, such as text notes, voice notes, previously captured media 233 (e.g., previously captured images or video). The client application 286 may also automatically add to the field report 223 the location 236 of the client device 103 or the time 239 that the field report 223 was created or last modified. In some instances, the client application 286 may allow the user to specify the location 236 for the field report (e.g., specifying a particular field if the user is generating the field report at the office). The user can then either upload the field report 223 to the analytical engine 279 for processing or sharing with other users.

For example, the user can upload the field report 223 to the analytical engine 279 in order to have the analytical engine 279 identify a potential pathogen affecting a crop in the field and the severity of the infestation. In some instances, the analytical engine 279 can further recommend a biocide to be applied to the crop as well as an amount of the biocide to be applied and a frequency for applying the biocide. In some instances, the analytical engine 279 can be configured to automatically share the identification of the pathogen, classification of the severity, and recommend treatment with another user, such as a licensed agronomist. In these instances, the field report 223, identified pathogen and severity, and recommended treatment may be presented to the second user via an instances of the client application 286 installed on his or her client device 103. The second user can then review and confirm or deny the findings and recommendation of the analytical engine 279. After the pathogen has been identified, the severity classified, and a course of treatment confirmed, the analytical engine 279 can then provide this data to the user that submitted the field report 223 to the analytical engine 279.

As another example, the user can upload the field report 223 to the analytical engine 279 in order to have the analytical engine 279 estimate a yield of a crop based at least in part on media 233 included in the field report 223. For example, the user could upload a field report containing multiple photographs of ears of corn (e.g. an ear of corn from every $5^{th}$, $10^{th}$, $20^{th}$, etc. stalk of corn) in a field. The analytical engine 279 could use computer-vision techniques to detect and identify individual kernels of corn in the images and calculate an estimated yield based on the average number of kernels of corn per ear of corn and the field size 246. Similar approaches could be used for other types of crops. For example, individual drupes of fruit could be identified in media 233 included in a field report 223 for a fruit crop and an estimated yield could be based on the number of drupes of fruit identified. As another example, individual heads of grain may be identified in media 233 included in a field report 223 for a grain crop an estimated yield could be based on the number of heads of grain per stalk of grain identified.

In some instances, users may also share field reports 223 that they have saved or that they have generated with other users. For example, a user could select a field report 223 through the client application 286 to share and one or more users or groups of users to share the field report 223 with. The selected users or groups of users would then receive a notification that the field report 223 has been shared with them. The selected users of groups of users could then view the shared field report 223 on their own client devices 103 using a respective instance of the client application 286.

In some instances, a user can configure sharing to occur automatically with a selected user or group of user. For example, a user could select one or more users (e.g., an agronomist or other agricultural specialist) to automatically receive a copy of a field report 223. As another example, a user could select one or more users to automatically receive a copy of a field report 223 in response to an occurrence of a condition (e.g., identification of an infestation in media 233 include in the field report 223).

Figure 3:
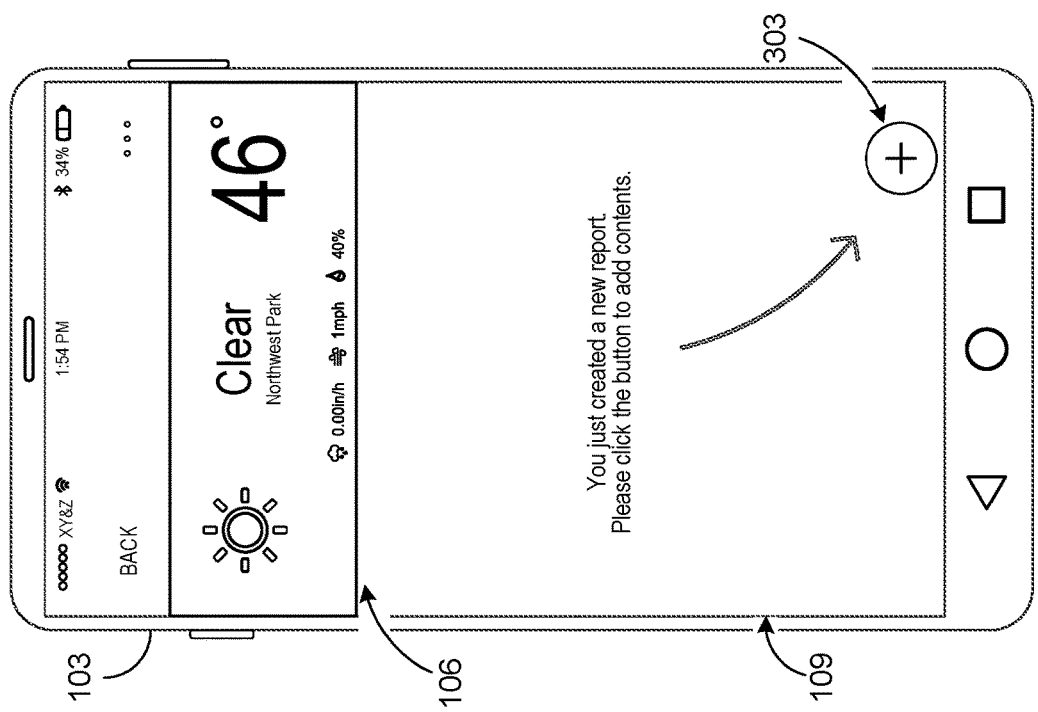
FIG. 3 is a drawing illustrating a user interface of an application executed by a client device in the networked environment of FIG. 2 according to various embodiments of the present disclosure.

Referring next to FIG. 3, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). For example, the user interface 106 depicted in FIG. 3 represents the first screen that would be presented to a user of a mobile computing device (e.g., a smartphone, tablet, etc.) if the user were to create a field report 223 (FIG. 2). The current time, location, and weather conditions are presented to the user. Moreover, a user can select or interact with a user interface element 303 to add additional content (e.g., media 233 (FIG. 2) such as photographs, videos, etc.).

Figure 4:
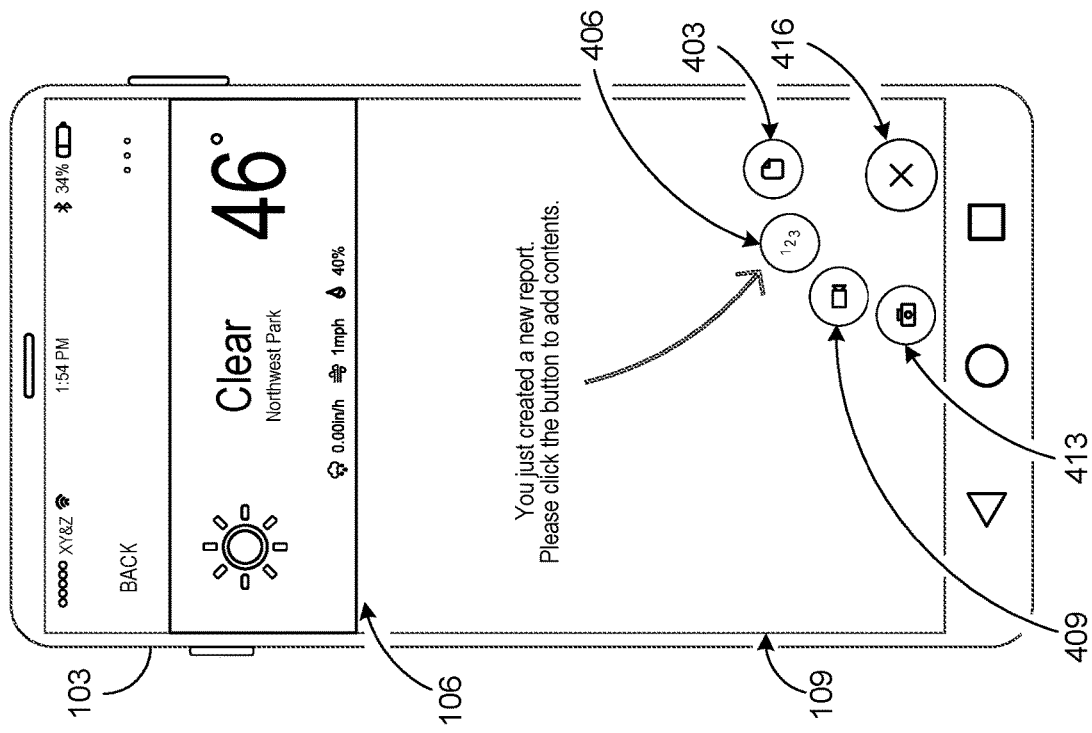
FIG. 4 is a drawing illustrating a user interface of an application executed by a client device in the networked environment of FIG. 2 according to various embodiments of the present disclosure.

Turning now to FIG. 4, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). For example, the user interface 106 depicted in FIG. 4 can represent a user interface 106 presented to the user in response to manipulation of the user interface element 303 (FIG. 3). As shown in FIG. 4, a number of additional user interface elements 403, 406, 409, 413, and 416 are rendered within the user interface 106 to allow a user to select the type of media 233 (FIG. 2) or other content that the user wishes to include with the field report 223 (FIG. 2). For example, the first user interface element 403 could be manipulated in order to add a note to the field report 223. As another example, the second user interface element 406 could be manipulated in order to add an automated diagnosis of an infestation or an automated estimation of crop yield to the field report 223. In another example, the third user interface element 409 could be manipulated in order to capture a video and add it to the field report 223. In addition, the fourth user interface element 413 could be manipulated in order to capture an image and add it to the field report 223. Finally, the fifth user interface element 416 could be manipulated to cancel the current use action (e.g., cancel the addition of content to the field report 223 and revert back to a prior state or return to a previous user interface 106, such as the user interface represented in FIG. 3.

Figure 5:
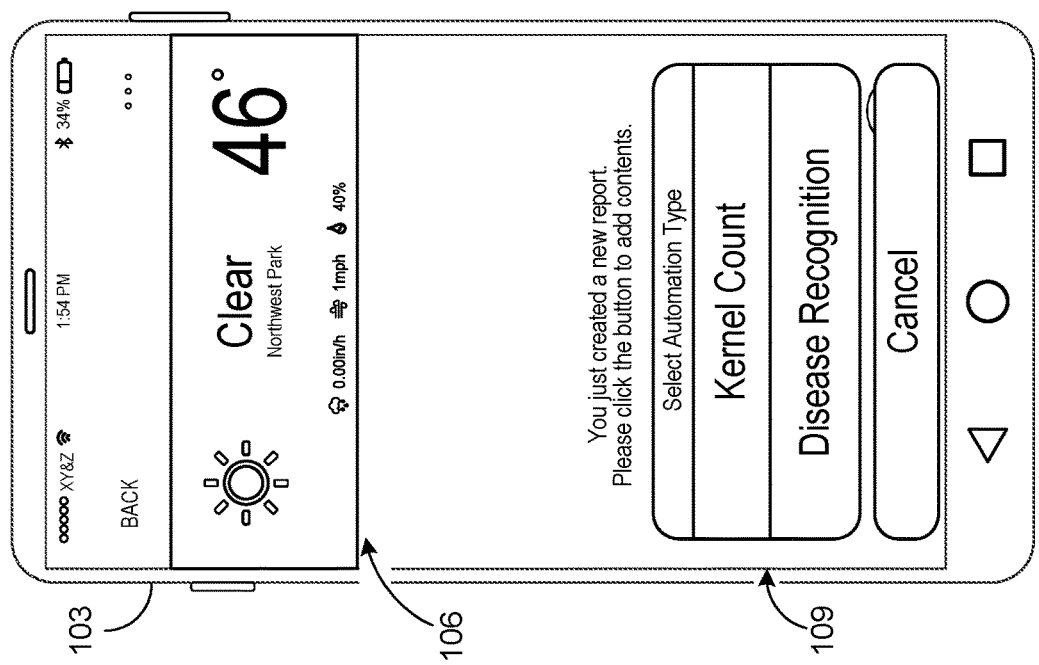
FIG. 5 is a drawing illustrating a user interface of an application executed by a client device in the networked environment of FIG. 2 according to various embodiments of the present disclosure.

Moving on to FIG. 5, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). For example, the user interface 106 depicted in FIG. 5 can represent a user interface 106 presented to the user in response to manipulation of the user interface element 406 (FIG. 4). The user interface 106 depicted in FIG. 5 allows for a user to select from multiple automated diagnostic options. For example, a user could select "Disease Recognition" in order to capture an image or video of a potentially diseased specimen or specimens of a crop. The captured image or video would then be uploaded to the analytical engine 279 for processing and the diagnosis added to the field report 223 (FIG. 2). As another example, a user could select "Kernel Count" in order to capture an image of an ear of corn and have the individual kernels automatically counted. The number of kernels and the image would also be added to the field report. For crops other than corn (e.g., grains, berries, vegetables, etc.), other types of yield estimation could be presented in addition to or in place of the depicted "Kernel Count."

Figure 6:
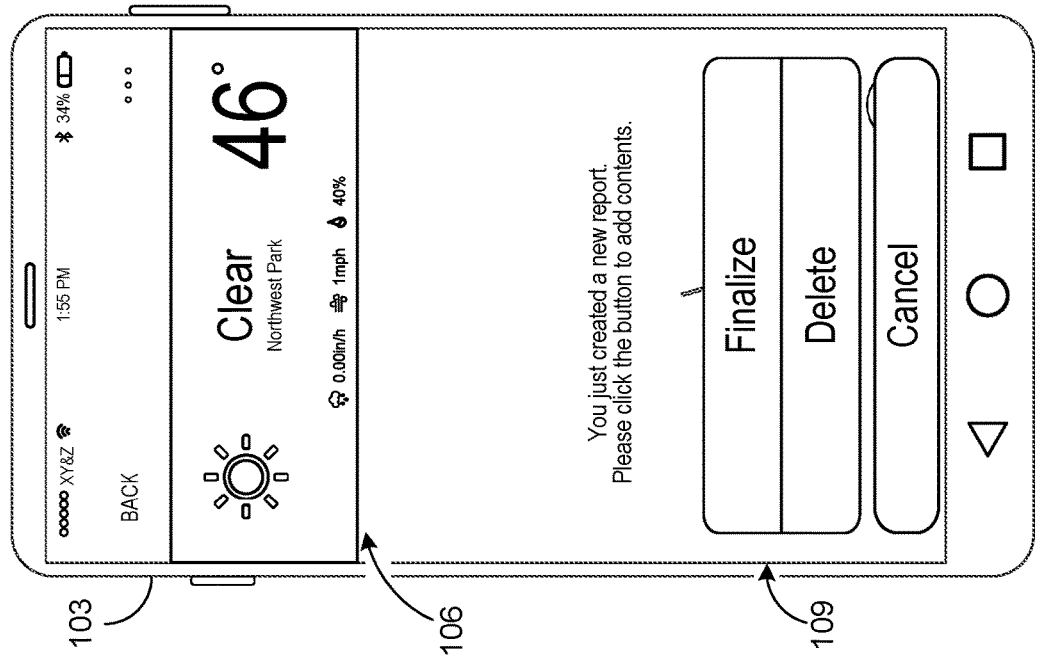
FIG. 6 is a drawing illustrating a user interface of an application executed by a client device in the networked environment of FIG. 2 according to various embodiments of the present disclosure.

Referring next to FIG. 6, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). Here, a user interface 106 is presented that allows a user to finalize the field report 223 (FIG. 2) and send it to the analytical engine 279 to be stored in the data store 213 (FIG. 2).

Figure 7:
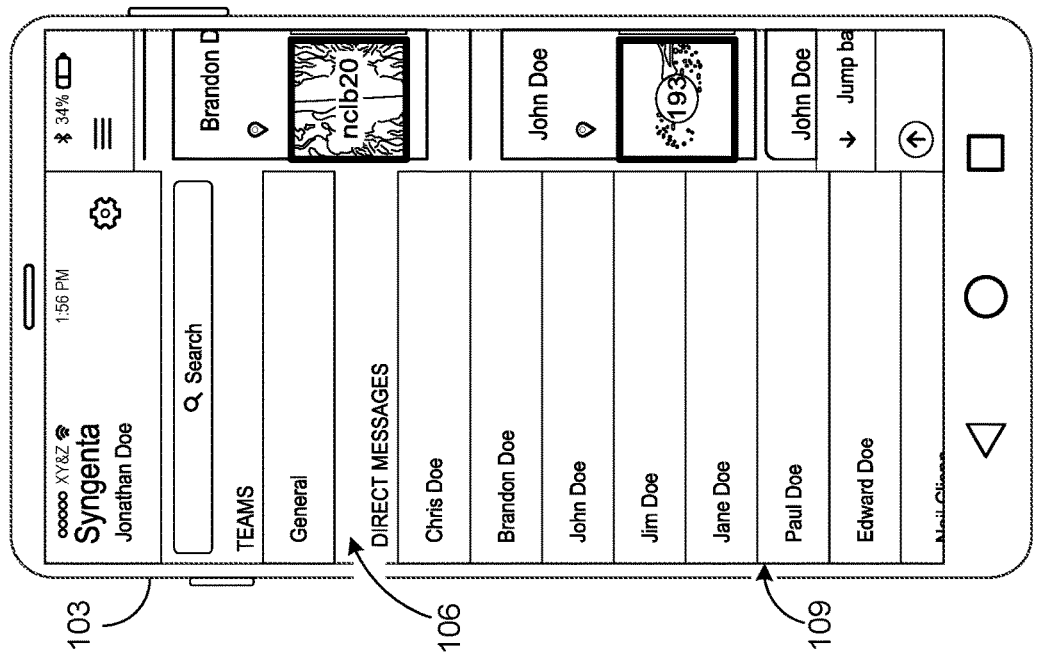
FIG. 7 is a drawing illustrating a user interface of an application executed by a client device in the networked environment of FIG. 2 according to various embodiments of the present disclosure.

Turning now to FIG. 7, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). The user interface 106 depicted in FIG. 7 allows for a user to select a recipient from a list of users that are part of the same company, group, team, etc. For example, the user could select one or more recipients for a message. Likewise, if a user wanted to share a field report 223 (FIG. 2) with one or more people, the user could select the recipients from the list of users. For example, if a user wanted to share a field report that included photographs of a blighted crop with an agronomist, the user could select the agronomist from the list of users.

Figure 8:
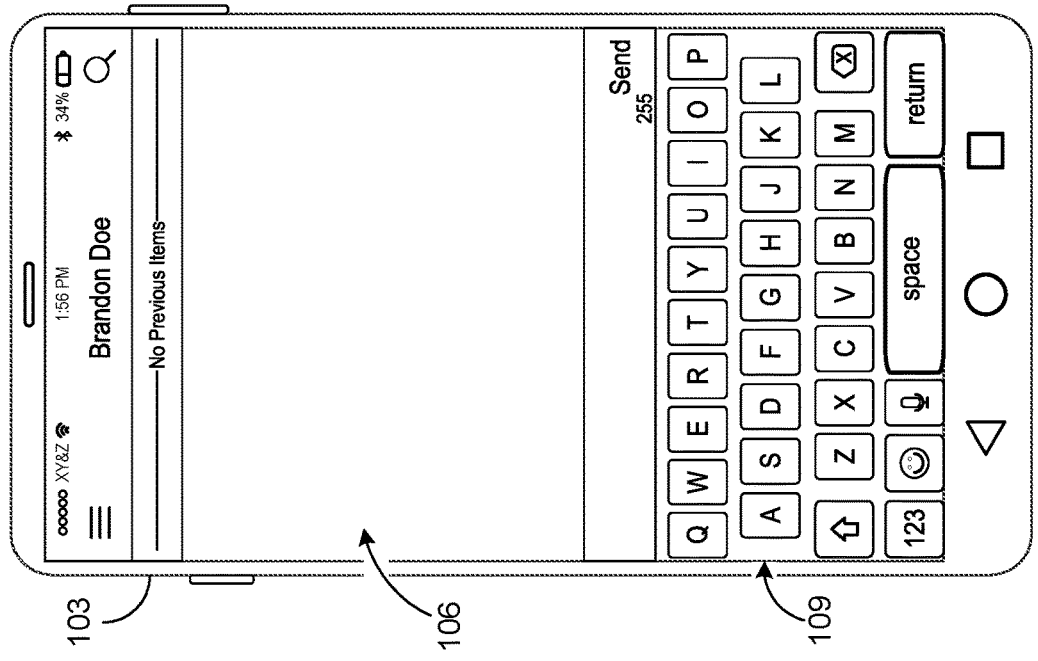
FIG. 8 is a drawing illustrating a user interface of an application executed by a client device in the networked environment of FIG. 2 according to various embodiments of the present disclosure.

Moving on to FIG. 8, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). Here, a messaging interface is presented to the user. In some embodiments, the user interface 106 of FIG. 8 could be presented on the display 109 in response to a user selecting one or more users as previously depicted in FIG. 7. The user interface 106 allows for a user to type and send a message to the selected recipients. In some embodiments of the present disclosure, the user interface 106 may also provide a function that allows a user to select additional data to send to the recipients (e.g., images, videos, notes, field reports 223, uniform resource locator (URL) links, etc.). These messages could be presented to a user in any number of formats.

Figure 9:
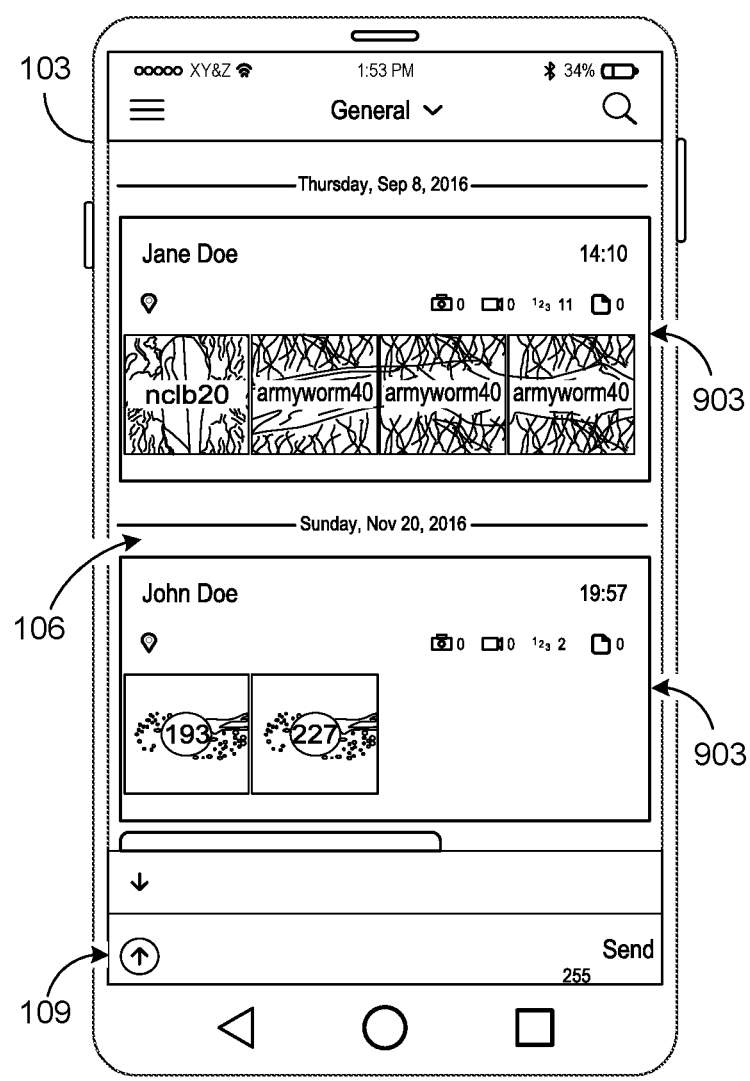
FIG. 9 is a drawing illustrating a user interface of an application executed by a client device in the networked environment of FIG. 2 according to various embodiments of the present disclosure.

Proceeding to FIG. 9, shown is an example of a user interface 106 rendered on a display 109 of the client device 103, according to various embodiments of the present disclosure. The user interface 106 depicted shows a portion of the functionality provided by the client application 286 (FIG. 2) acting in concert with the analytical engine 279 (FIG. 2). The user interface 106 depicted shows one or more messages 903 received from other users. Here, the messages 903 are presented in a "newsfeed" style, which allows a user to scroll through messages that have been received with a summary of the contents of each message 903 displayed. A user can select any individual message 903 in order to view its full contents within the user interface 106. A message 903 can include field reports 223 shared with the user, text messages, messages with media 233 (e.g., images, video, etc.) attached, and other kinds of messages.

Figure 10:
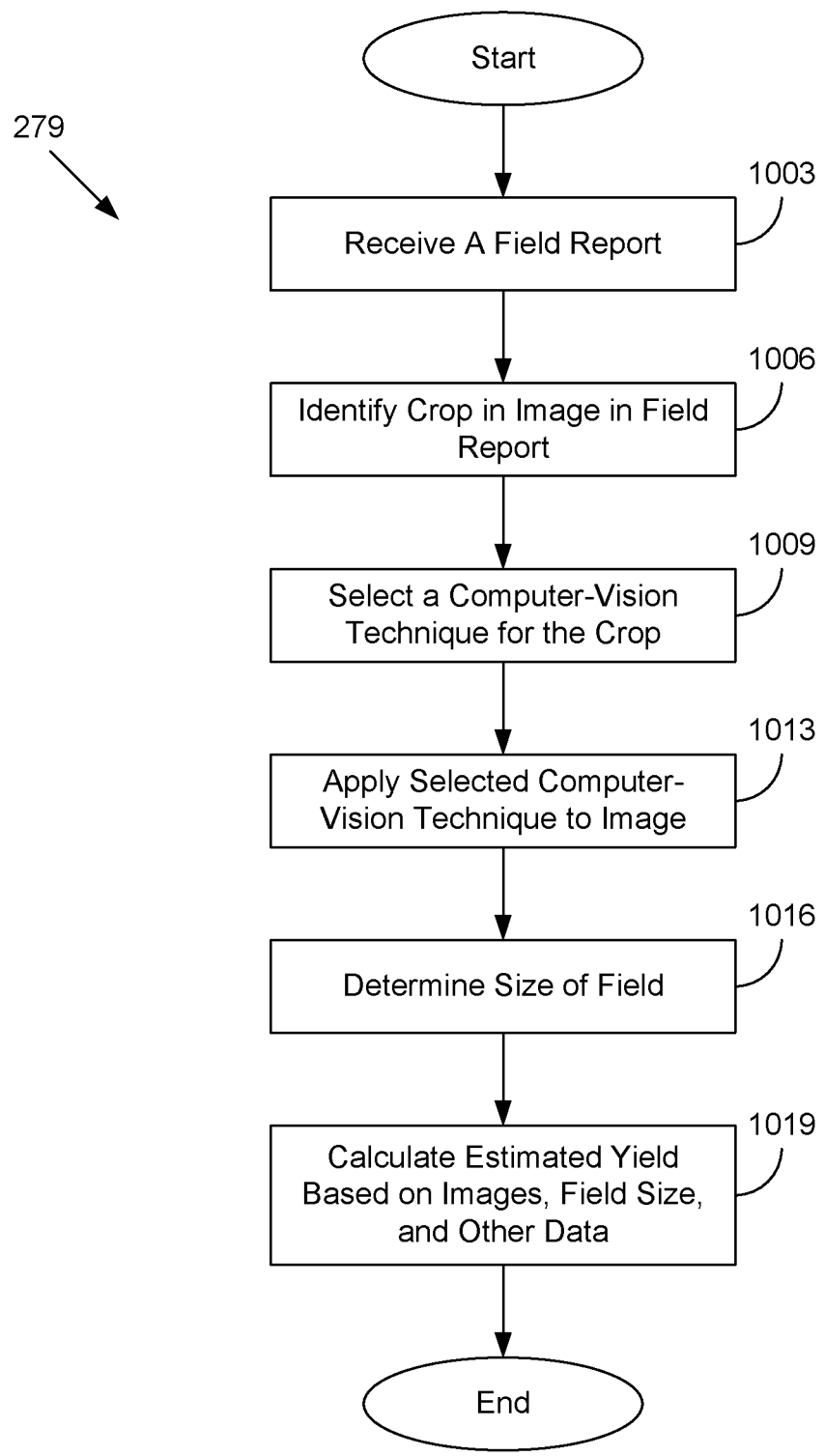
FIG. 10 is a flowchart illustrating one example of functionality implemented as portions of an application executed in a computing environment in the networked environment of FIG. 2 according to various embodiments of the present disclosure.

Referring next to FIG. 10, shown is a flowchart that provides one example of the operation of a portion of the analytical engine 279 according to various embodiments. It is understood that the flowchart of FIG. 10 provides merely an example of the many different types of functional arrangements that may be employed to implement the operation of the portion of the analytical engine 279 as described herein. As an alternative, the flowchart of FIG. 10 may be viewed as depicting an example of elements of a method implemented in the computing environment 203 (FIG. 2) according to one or more embodiments.

Beginning with box 1003, the analytical engine 279 receives one or more field reports 223 (FIG. 2) from a client device 103 (FIG. 2). For example, the analytical engine 279 could receive a single field report 223 containing media 233, such as a single image or multiple images of a crop in a field. As another example, the analytical engine 279 could receive multiple field reports 223, each of which containing a single image or multiple images of a crop in a field. Upon receiving the field reports 223, the analytical engine 279 may extract and temporarily store all of the images for further processing.

Moving on to box 1006, the analytical engine 279 can identify the crop or type of plant in the image or images in the received field report. The analytical engine 279 may, for example, apply a first computer-vision technique to detect individual objects in the image. Examples of such computer-vision techniques can include edge detection, blob detection, and other approaches. The analytical engine 279 can then compare the detected objects to examples of particular crops or plants to identify the crop or plant in the media 233.

Proceeding to box 1009, the analytical engine 279 can then select an appropriate computer-vision technique for the particular crop to use in estimating crop yield. Different types of crops may have their yield calculated or estimated differently. For example, corn may involve recognizing individual kernels on an ear of corn and counting the number of kernels on an ear and the number of ears on a plant. As another example, estimating the yield of grain crops may require recognizing individual heads of grain in a given area and counting the number of individual grains per head. While the same approach may be used for multiple different types of crops, different approaches may be necessary for some crops. For example, edge detection may be a more accurate choice in some instances while blob detection may be a more useful approach in other instances.

Referring next to box 1013, the analytical engine 279 applies the selected computer vision technique to the media 233 included in the previously received field report(s) 223 to identify and count the appropriate objects for the crop. For example, the analytical engine 279 may use the selected computer-vision technique to identify and count individual kernels of corn in an image or individual heads of grain in an image.

Moving on to box 1016, the analytical engine 279 determines the size of the field on which the crop has been planted. In some instances, these dimensions may have been previously submitted or recorded as the field size 246 (FIG. 2) in the field data 226 (FIG. 2). In other instances, the analytical engine 279 may calculate, determine, or estimate the dimensions of the field based on the media 233 included in the previously received field report(s) 223. The analytical engine 279 could then determine a field size 246 based on the estimated dimensions of the field.

Proceeding next to box 1019, the analytical engine 279 can then calculate the estimated yield of the crop in the field based at least in part on the data obtained in the previous steps. For example, to estimate the yield of a crop of corn, the analytical engine 279 can determine the average number of kernels identified in an ear of corn and the average number of ears of corn on a stalk of corn, as previously determined from the received media 233 in step X13. The analytical engine 279 could then determine the average number of stalks of corn in a given area (e.g., square foot, square yard, square meter, etc.) based on the spacing of between stalks recorded in the planting data 249. The estimated yield of a crop of corn would therefore be the product of the field size 246 multiplied by the average number of stalks of corn in a given area, the average number of ears per stalk, and the average number of kernels per ear. A similar approach can be used for other crops, such as grains, fruits, vegetables, etc.

Figure 11:
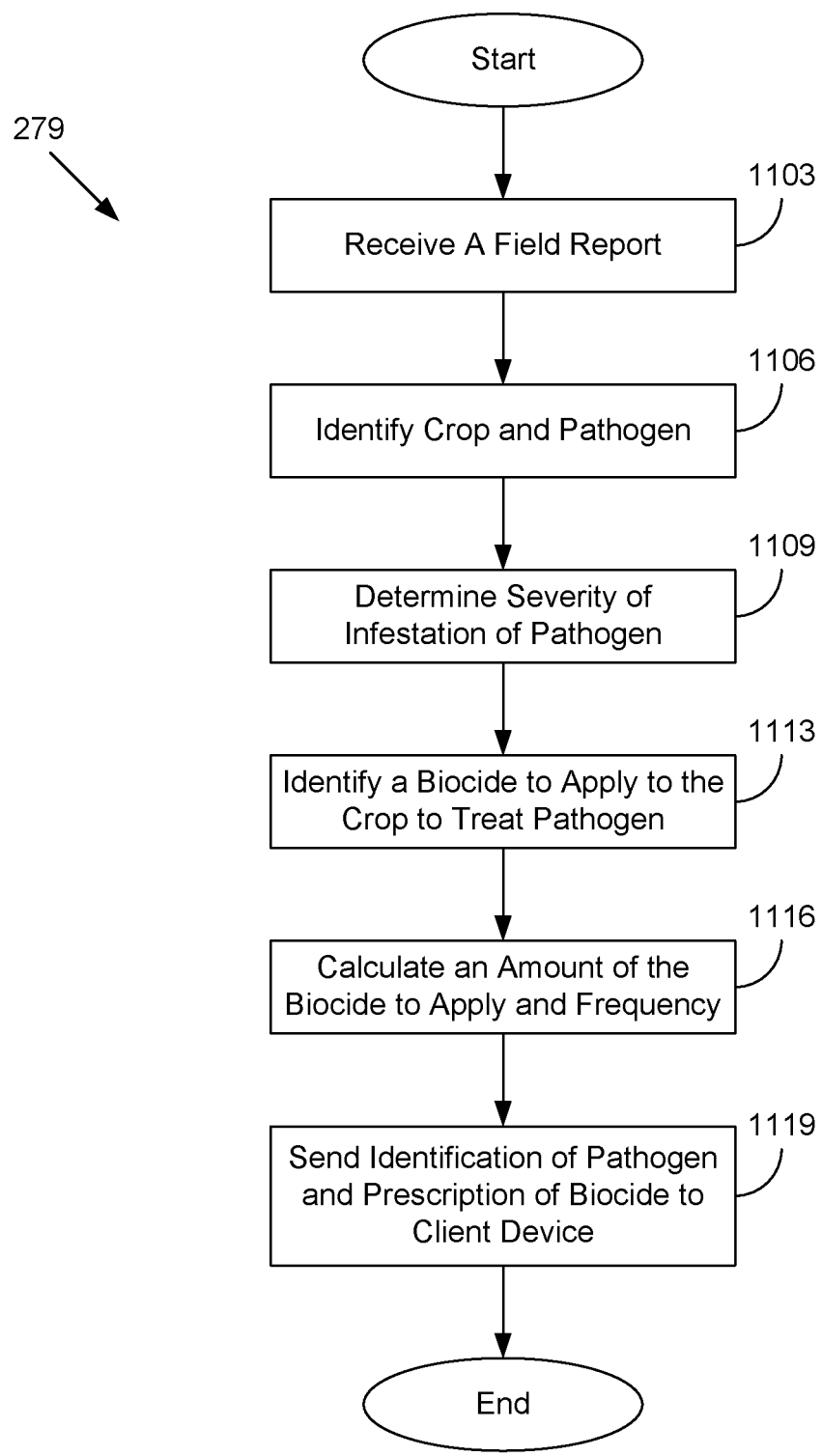
FIG. 11 is a flowchart illustrating one example of functionality implemented as portions of an application executed in a computing environment in the networked environment of FIG. 2 according to various embodiments of the present disclosure.

Referring next to FIG. 11, shown is a flowchart that provides one example of the operation of a portion of the analytical engine 279 according to various embodiments. It is understood that the flowchart of FIG. 11 provides merely an example of the many different types of functional arrangements that may be employed to implement the operation of the portion of the analytical engine 279 as described herein. As an alternative, the flowchart of FIG. 11 may be viewed as depicting an example of elements of a method implemented in the computing environment 203 (FIG. 2) according to one or more embodiments.

Beginning with box 1103, the analytical engine 279 receives one or more field reports 223 (FIG. 2) from a client device 103 (FIG. 2). For example, the analytical engine 279 could receive a single field report 223 containing media 233, such as a single image or multiple images of a crop in a field. As another example, the analytical engine 279 could receive multiple field reports 223, each of which contain media 233 such as a single image or multiple images of a crop in a field. In some instances, the media 233 may correspond to individual plants of the crop in addition to or in place of an image of the wider crop itself.

Moving on to box 1106, the analytical engine 279 identifies the crop and any pathogens in the media 233 included in the field report(s) 223. For example, the analytical engine 279 can use computer vision techniques (e.g., edge detection, blob detection, etc.) to discover objects in the media 233 and then use various machine-learning techniques (e.g., neural networks, support vector machines, etc.) to classify or identify the objects in the media 233. For example, the media 233 in the field report(s) 223 may be compared to images of individual plants or crops of plants to identify the plants or crops present in the images(s) in the field report(s) 223. As a further example, the media 233 in the field report(s) 223 may be compared to the training data 273 (FIG. 2) to identify a pathogen afflicting the plant or the crop. As certain pathogens only affect certain crops, the media 233 in the field report(s) may, in some embodiments, only be compared to the training data 273 of particular pathogens know to affect the crop or plants depicted in the media 233.

Proceeding to box 1109, the analytical engine 279 determines the severity of the infestation of the pathogen based at least in part on the media 233 in the field report(s) 223. For example, the analytical engine 279 may compare one or more of the media 233 to images of infestations of a known severity included in the training data 273 in the pathogen data 219 for the identified pathogen. If the media 233 are similar to the characteristics of one or more images included in the training data 273, then the analytical engine 279 can determine that the severity of the infestation is the same as or similar to the known severity of the images in the training data 273. The comparison between the media 233 and the training data to identify the severity can be made using a number of machine learning approaches, such as neural networks.

Referring next to box 1113, the analytical engine 279 can identify an appropriate biocide to apply to the crop. For example, the analytical engine 279 can select refer to the treatment data 276 to select biocide. The biocide can be selected based on a number of factors. For example, the biocide can be selected based on the type of pathogen identified, as certain pathogens are more susceptible to particular biocides or classes of biocides. If multiple biocides are listed in the treatment data 276 as effective, then multiple biocides may be recommended or a subset of the biocides may be selected based at least in part on additional factors. The additional factors could include a potential environmental impact associated with using the biocide (e.g., potential toxicity to humans, wildlife, etc. or a half-life of the biocide), availability of the biocide, a regulatory burden associated with using the biocide (e.g., what types of permits or licenses are required to acquire and use the biocide), or financial cost associated with procuring, storing, or applying the biocide. The analytical engine 279 may also select a particular biocide based on various factors specific to the field. For example, certain biocides may work more effectively with particular varieties of seeds planted for a crop. Accordingly, the analytical engine 279 may cross-reference seed data 266 of a crop with the treatment data 276 to select the most effective biocide.

Moving on to box 1116, the analytical engine 279 can then calculate an amount of the biocide to apply and a frequency of application. For example, the treatment data 276 can list, for a given biocide and pathogen, an amount of the biocide per area (e.g., per acre, per hectare, per square meter, etc.) to apply for a given severity of the infestation as well as a frequency of application of the biocide to apply for the given severity of the infestation. The analytical engine 279 can then multiply the field size 246 by the amount of the biocide per area to apply for the identified severity of the infestation to determine an amount of the biocide to apply at the identified frequency of application.

The analytical engine 279 may also adjust the calculated amount of the biocide and frequency of application based on various factors specific to the field. For example, some biocides may be more effective than others in a particular type of soil or the type of soil may affect the amount of a biocide to apply (e.g., clay soils may absorb less of the biocide than sandy soils). Accordingly, the analytical engine 279 can further cross-reference the soil data 253 of a particular field with the treatment data 276 to determine whether an adjustment should be made to the amount and frequency of application and make any necessary adjustments to the calculation. Likewise, the spacing of individual plantings within a crop may affect the amount to be applied, as more densely planted crops may require more biocide to be applied to treat an infestation than less dense plantings of the same crop. Accordingly, the analytical engine 279 can further cross-reference the planting data 249 with the treatment data 276 to determine whether an adjustment should be made to the amount and frequency of application and make any necessary adjustments to the calculation.

Proceeding next to box 1119, the analytical engine 279 can then send the identification of the pathogen and a prescription (e.g., type of biocide to apply and the amount and frequency of application) to a client device 103. In some instances, this information can be sent to the client device 103 that supplied the field report(s) 223. In other instances, this information can be sent to a specified client device 103 (e.g., a client device 103 of an agronomist for the agronomist to review, confirm, and approve the identification and prescription).

Figure 12:
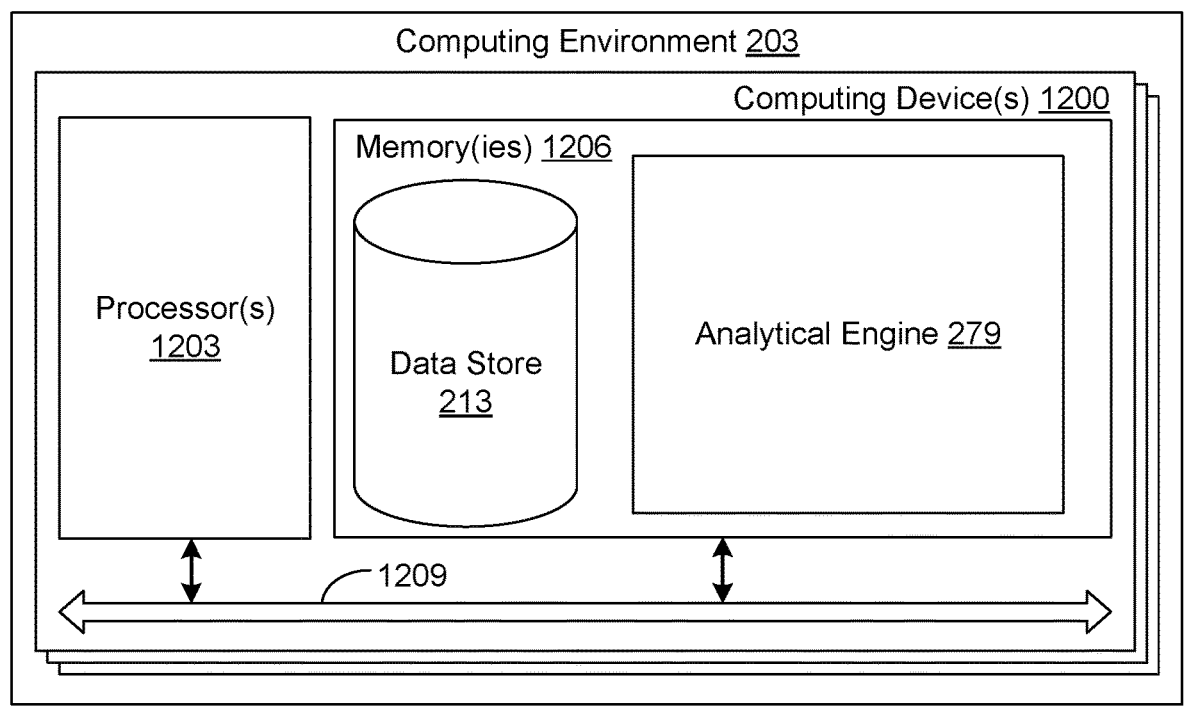
FIG. 12 is a schematic block diagram that provides one example illustration of a computing environment employed in the networked environment of FIG. 2 according to various embodiments of the present disclosure.

With reference to FIG. 12, shown is a schematic block diagram of the computing environment 203 according to an embodiment of the present disclosure. The computing environment 203 includes one or more computing devices 1200. Each computing device 1200 includes at least one processor circuit, for example, having a processor 1203 and a memory 1206, both of which are coupled to a local interface 1209. To this end, each computing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 is the analytical engine 279, and potentially other applications. Also stored in the memory 1206 may be a data store 213 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 or multiple processor cores and the memory 1206 may represent multiple memories 1103 that operate in parallel processing circuits, respectively. In such a case, the local interface 1209 may be an appropriate network that facilitates communication between any two of the multiple processors 1203, between any processor 1203 and any of the memories 1103, or between any two of the memories 1103, etc. The local interface 1209 may comprise additional systems designed to coordinate this communication, including, for example, performing load balancing. The processor 1203 may be of electrical or of some other available construction.

Although the analytical engine 279 and other various systems described herein may be embodied in software or code executed by general purpose hardware as discussed above, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts of FIGS. 10 and 11 show the functionality and operation of an implementation of portions of the analytical engine 279. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 10 and 11 show a specific order of execution, it is understood that the order of execution may differ from that which is depicted. For example, the order of execution of two or more blocks may be scrambled relative to the order shown. Also, two or more blocks shown in succession in FIGS. 10 and 11 may be executed concurrently or with partial concurrence. Further, in some embodiments, one or more of the blocks shown in FIGS. 10 and 11 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein, including the analytical engine 279, that includes software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the analytical engine 279, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a first computing device comprising a processor and a memory; and
   machine readable instructions stored in the memory that, when executed by the processor, cause the first computing device to at least:
   receive a field report from a second computing device, the field report comprising a plurality of images of a corresponding plurality of plants in a crop and an identifier of a respective field;
   apply a first object-recognition technique to each image in the plurality of images to determine a type of the crop;
   select a second object-recognition technique based on the type of the crop;
   apply the second object-recognition technique each image in the plurality of images to determine the individual yield for each of the corresponding plants in the crop;
   determine a size of a corresponding field based on the identifier of the respective field; and
   calculate an estimated crop yield based at least in part on the individual yield for each of the corresponding plants in the crop and the size of the respective field.

2. The system of claim 1, wherein the estimated crop yield is further based at least in part on planting data associated with the respective field.

3. The system of claim 1, wherein the second computing device comprises a wearable computing device.

4. The system of claim 1, wherein the second computing device comprises a mobile computing device.

5. A non-transitory, computer-readable medium comprising machine-readable instructions that, when executed by a processor of a first computing device, cause the first computing device to at least:
   receive a field report from a second computing device, the field report comprising a plurality of images of a corresponding plurality of plants in a crop and an identifier of a respective field;
   apply a first object-recognition technique to each image in the plurality of images to determine a type of the crop;
   select a second object-recognition technique based on the type of the crop;
   apply the second object-recognition technique each image in the plurality of images to determine the individual yield for each of the corresponding plants in the crop;
   determine a size of a corresponding field based on the identifier of the respective field; and
   calculate an estimated crop yield based at least in part on the individual yield for each of the corresponding plants in the crop and the size of the respective field.

6. The non-transitory, computer-readable medium comprising machine-readable of claim 5, wherein the estimated crop yield is further based at least in part on planting data associated with the respective field.

7. The non-transitory, computer-readable medium comprising machine-readable of claim 5, wherein the second computing device comprises a wearable computing device.

8. The non-transitory, computer-readable medium comprising machine-readable of claim 5, wherein the second computing device comprises a mobile computing device.

9. A method, comprising:
- receiving, with a first computing device, a field report from a second computing device, the field report comprising a plurality of images of a corresponding plurality of plants in a crop and an identifier of a respective field;
- applying, with the first computing device, a first object-recognition technique to each image in the plurality of images to determine a type of the crop;
- selecting, with the first computing device a second object-recognition technique based on the type of the crop;
- applying, with the first computing device, the second object-recognition technique each image in the plurality of images to determine the individual yield for each of the corresponding plants in the crop;
- determining, with the first computing device, a size of a corresponding field based on the identifier of the respective field; and
- calculating, with the first computing device, an estimated crop yield based at least in part on the individual yield for each of the corresponding plants in the crop and the size of the respective field.

10. The method of claim 9, wherein the estimated crop yield is further based at least in part on planting data associated with the respective field.

11. The method of claim 9, wherein the second computing device comprises a wearable computing device.

12. The method of claim 9, wherein the second computing device comprises a mobile computing device.

* * * * *